US009086867B2

(12) United States Patent
Hamasaki

(10) Patent No.: US 9,086,867 B2
(45) Date of Patent: Jul. 21, 2015

(54) POWER CONTROL FOR AN EXTERNAL DEVICE BASED ON DEVICE IDENTIFICATION INFORMATION

(75) Inventor: Takanari Hamasaki, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 396 days.

(21) Appl. No.: 13/365,298

(22) Filed: Feb. 3, 2012

(65) Prior Publication Data

US 2012/0204043 A1   Aug. 9, 2012

(30) Foreign Application Priority Data

Feb. 9, 2011   (JP) .................................. 2011-026556

(51) Int. Cl.

| G06F 1/32 | (2006.01) |
|---|---|
| G06F 1/00 | (2006.01) |
| G06F 1/26 | (2006.01) |
| G06F 3/00 | (2006.01) |
| G06F 13/00 | (2006.01) |
| H05K 7/10 | (2006.01) |
| G03G 15/00 | (2006.01) |
| G06F 13/40 | (2006.01) |

(52) U.S. Cl.
CPC ............ *G06F 1/266* (2013.01); *G03G 15/5004* (2013.01); *G06F 1/325* (2013.01); *G06F 1/3215* (2013.01); *G06F 1/3284* (2013.01); *G06F 1/3287* (2013.01); *G06F 1/3253* (2013.01);

(Continued)

(58) Field of Classification Search
CPC ......... G06F 1/32; G06F 1/3234; G06F 1/325; G06F 1/3253; G06F 1/3287; G06F 1/3215; G06F 13/4081; G06F 9/4418; G06F 9/4411; G06F 9/4415

USPC ............. 713/300, 320, 323, 324; 710/14, 16, 710/302, 100
See application file for complete search history.

(56) References Cited

U.S. PATENT DOCUMENTS 7,103,788 B1 *   9/2006   Souza et al. .................. 713/323
2008/0104422 A1 *   5/2008   Mullis et al. .................. 713/300

(Continued)

FOREIGN PATENT DOCUMENTS

| JP | 2000010907 A | 1/2000 |
| JP | 2009302831 A | 12/2009 |

(Continued)

OTHER PUBLICATIONS

Abstract of JP 2010-186239 published Aug. 26, 2010.

(Continued)

*Primary Examiner* — Ji H Bae
(74) *Attorney, Agent, or Firm* — Harness, Dickey & Pierce, P.L.C.

(57) ABSTRACT

In an embodiment, an information processing apparatus has a low power mode. The information processing apparatus includes: a communication control unit; a table that stores identification information identifying an external device in association with an operation need/no-need information representing an operation need/no-need of the external device in the low power mode; a power supply control unit that acquires identification information from an external device at a time of transition to the low power mode, and performs control such that supply of electric power to the communication control unit is to be restricted when determined that the operation need/no-need information corresponding to the identification information represents the operation no-need based on the table, and such that supply of electric power to the communication control unit is continued when determined that the operation need/no-need information represents the operation need based on the table.

10 Claims, 11 Drawing Sheets

(52) U.S. Cl.
CPC ......... *G06F 13/4081* (2013.01); *Y02B 60/1267* (2013.01)

(56) References Cited

U.S. PATENT DOCUMENTS

2010/0115296 A1* 5/2010 Inoue et al. ................ 713/300
2010/0241889 A1* 9/2010 Fu et al. .................... 713/324
2012/0005508 A1* 1/2012 Por et al. ................... 713/323
2012/0017101 A1* 1/2012 So et al. .................... 713/300

FOREIGN PATENT DOCUMENTS

JP    2010111105 A    5/2010
JP    2010186239 A    8/2010

OTHER PUBLICATIONS

Abstract of JP 2010-111105 published May 20, 2010.
Abstract of JP 2009-302831 published Dec. 24, 2009.
Abstract of JP 2000-010907 published Jan. 14, 2000.

* cited by examiner

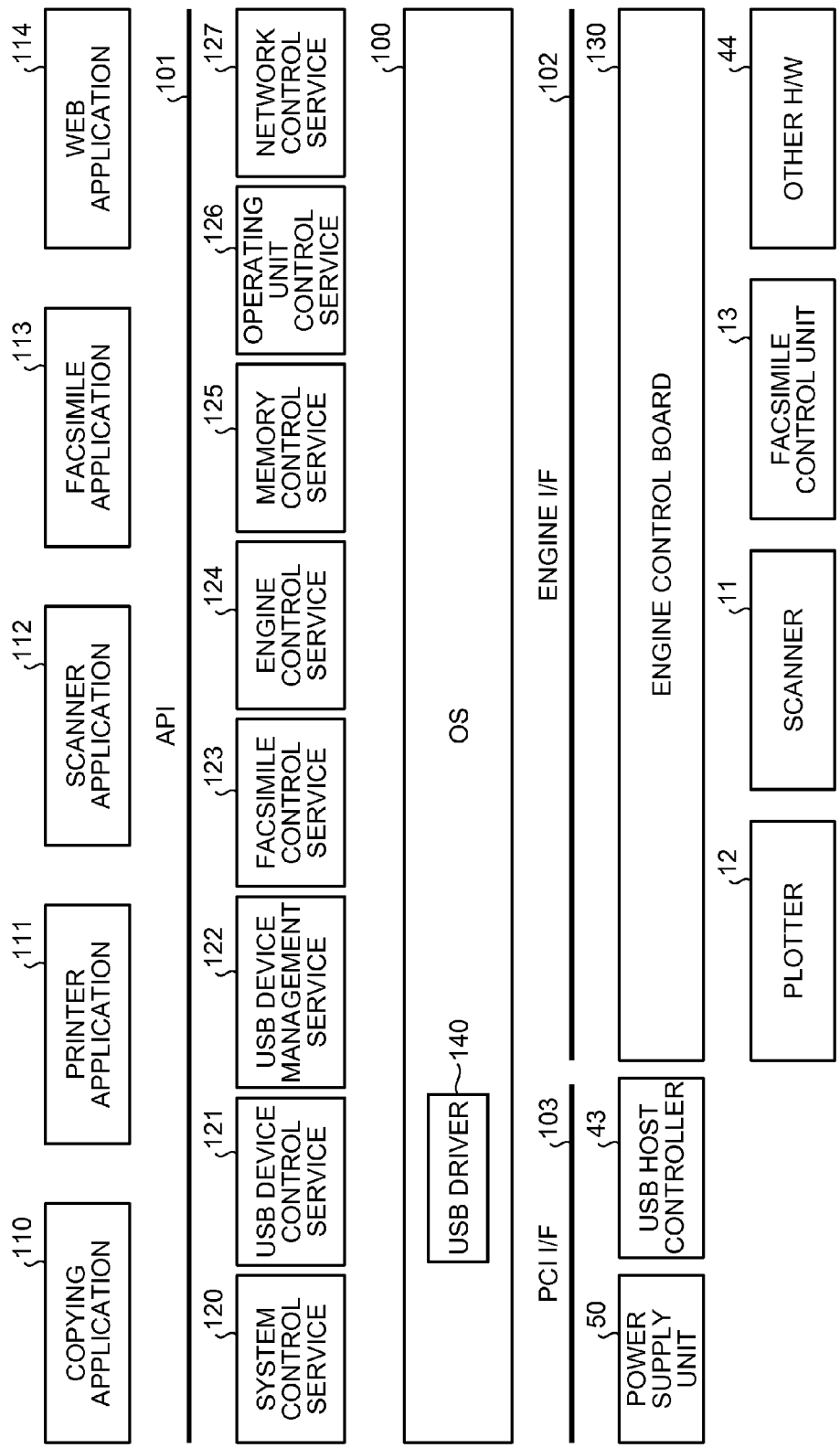

FIG.3

| OFFSET | FIELD NAME | SIZE (BYTE) | DESCRIPTION |
|---|---|---|---|
| 0 | bLength | 1 | BYTE LENGTH OF DESCRIPTOR |
| 1 | bDescriptorType | 1 | KIND OF DESCRIPTOR |
| 2 | bcdUSB | 2 | USB SPECIFICATION RELEASE NO. |
| 4 | bDeviceClass | 1 | CLASS CODE |
| 5 | bDeviceSubclass | 1 | SUBCLASS CODE |
| 6 | bDeviceProtocol | 1 | PROTOCOL CODE |
| 7 | bMaxPacketSize0 | 1 | MAXIMUM PACKET LENGTH OF END POINT 0 |
| 8 | idVendor | 2 | VENDOR ID |
| 10 | idProduct | 2 | PRODUCT ID |
| 12 | bcdDevice | 2 | VERSION (BCD) OF DEVICE |
| 14 | iManufacturer | 1 | INDEX OF STRING DESCRIPTOR ON VENDOR |
| 15 | iProduct | 1 | INDEX OF STRING DESCRIPTOR ON PRODUCT |
| 16 | iSerialNumber | 1 | INDEX OF STRING DESCRIPTOR ON SERIAL NO. |
| 17 | bNumConfiguration | 1 | NUMBER OF CONFIGURATIONS |

FIG.4

| OFFSET | FIELD NAME | SIZE (BYTE) | DESCRIPTION |
|---|---|---|---|
| 0 | bLength | 1 | BYTE LENGTH OF DESCRIPTOR |
| 1 | bDescriptorType | 1 | KIND OF DESCRIPTOR |
| 2 | wTotalLength | 2 | TOTAL BYTE NUMBER OF CONFIGURATION DESCRIPTOR AND ALL DESCRIPTORS BELONGING THERETO |
| 4 | bNumInterface | 1 | NUMBER OF INTERFACES IN CONFIGURATION |
| 5 | bConfigurationValue | 1 | IDENTIFIER OF CONFIG |
| 6 | iConfiguration | 1 | INDEX OF STRING DESCRIPTOR ON CONFIGURATION |
| 7 | bmAttributes | 1 | BIT 6: 1 (SELF POWER)/0 (BUS POWER) BIT 5: WHETHER OR NOT REMOTE WAKE-UP IS SUPPORTED |
| 8 | bMaxPower | 1 | MAXIMUM CURRENT VALUE (1/2) WHEN BUS POWER IS REQUESTED |

FIG.5

| OFFSET | FIELD NAME | SIZE (BYTE) | DESCRIPTION |
|---|---|---|---|
| 0 | bLength | 1 | BYTE LENGTH OF DESCRIPTOR |
| 1 | bDescriptorType | 1 | KIND OF DESCRIPTOR |
| 2 | bInterfaceNumber | 1 | INTERFACE IDENTIFICATION NO. |
| 3 | bAlternateSetting | 1 | VALUE FOR SELECTING ALTERNATE INTERFACE |
| 4 | bNumEndpoint | 1 | NUMBER OF SUPPORTED END POINTS (EXCLUDING END POINT 0) |
| 5 | bInterfaceClass | 1 | CLASS CODE |
| 6 | bInterfaceSubclass | 1 | SUBCLASS CODE |
| 7 | bInterfaceProtocol | 1 | PROTOCOL CODE |
| 8 | iInterface | 1 | INDEX OF STRING DESCRIPTOR ON INTERFACE |

FIG.6

| OFFSET | FIELD NAME | SIZE (BYTE) | DESCRIPTION |
|---|---|---|---|
| 0 | bLength | 1 | BYTE LENGTH OF DESCRIPTOR |
| 1 | bDescriptorType | 1 | KIND OF DESCRIPTOR |
| 2 | bEndpointAddress | 1 | END POINT NO. (INCLUDING DIRECTION) → IT IS ABLE TO KNOW TRANSFER DIRECTION (IN/OUT) OF END POINT |
| 3 | bmAttributes | 1 | REPRESENT TRANSFER FORM → CONTROL/BULK/INTERRUPT/ISOCHRONOUS |
| 4 | wMaxPacketSize | 1 | SUPPORTED MAXIMUM PACKET SIZE |
| 5 | bInterval | 1 | MAXIMUM DELAY TIME/POLING INTERVAL/NAK RATE |

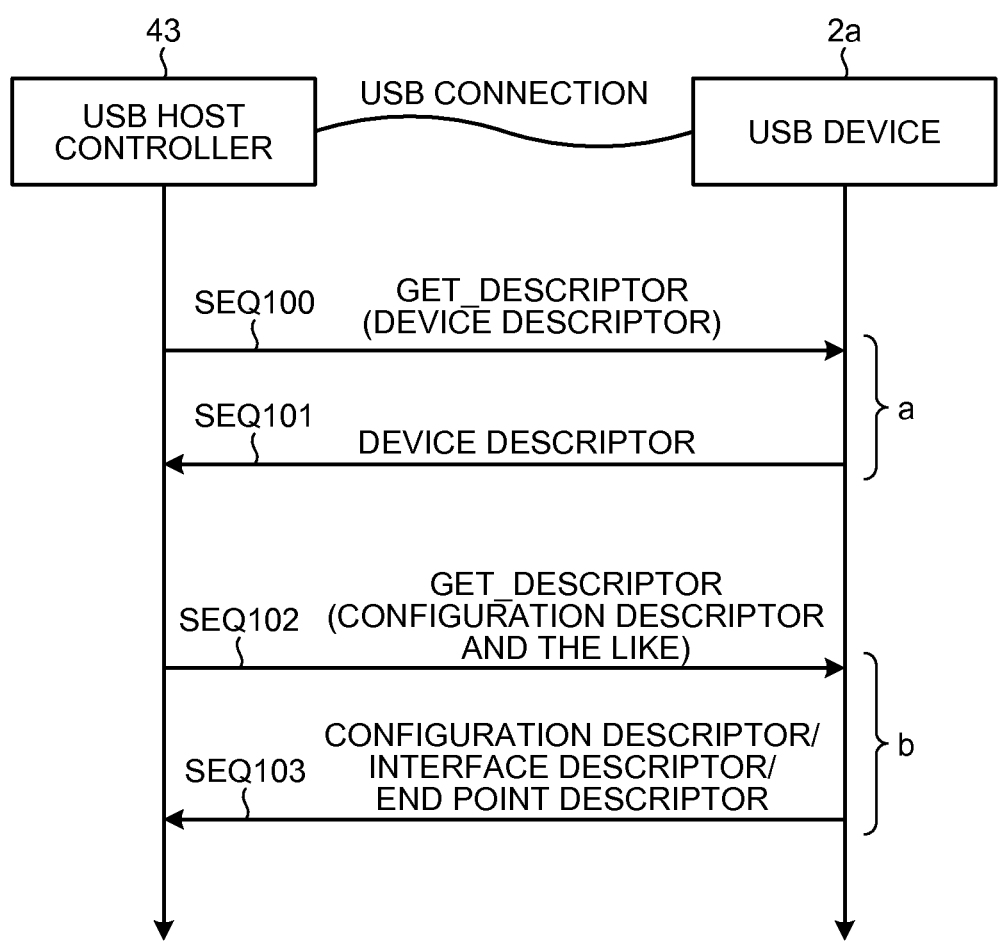

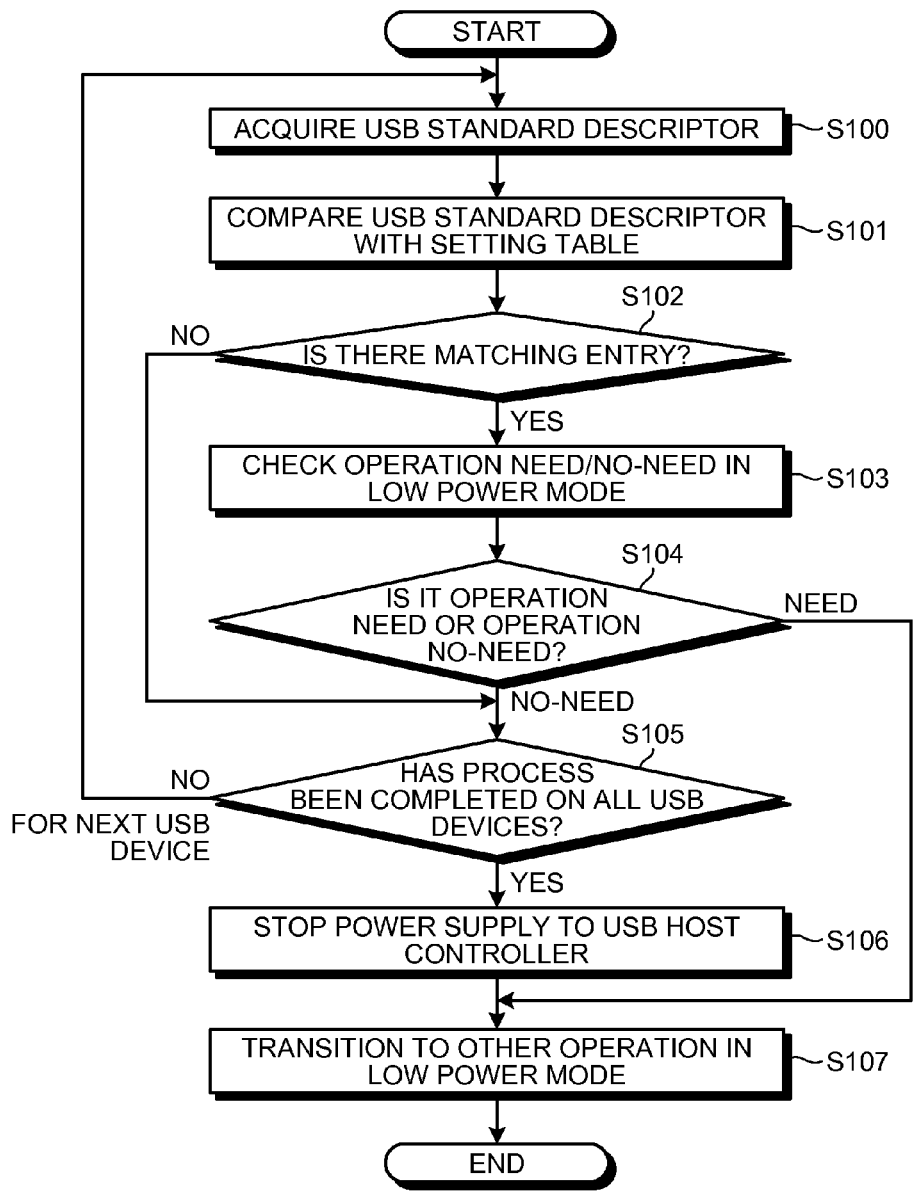

| bDeviceClass | bDeviceSubclass | bDeviceProtocol | OPERATION NEED/ NO-NEED IN LOW POWER MODE |
|---|---|---|---|
| 0x0B | * | * | 1 |
| 0x03 | * | 0x01 | 1 |
| 0x09 | 0x00 | * | 0 |

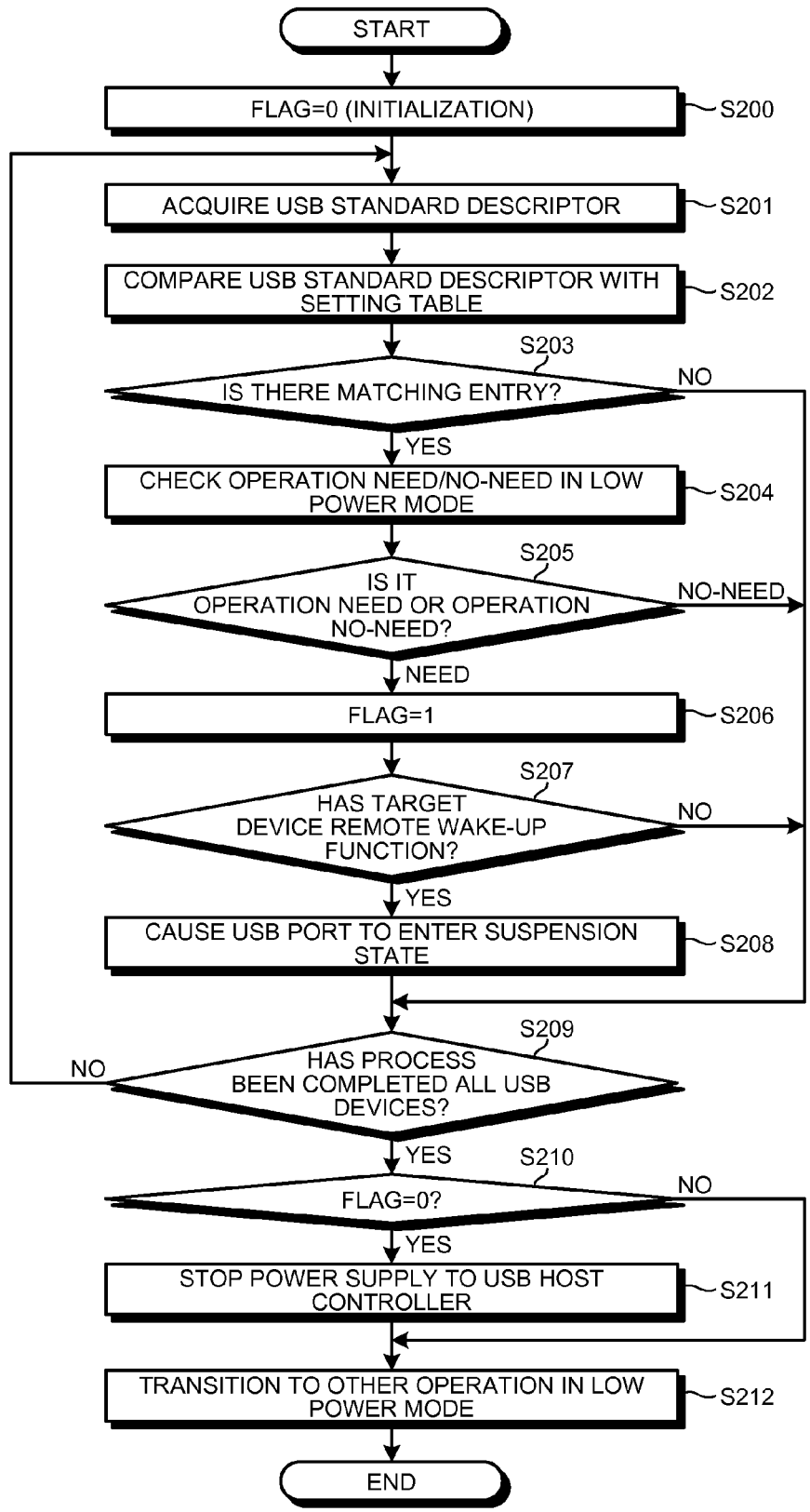

POWER CONTROL FOR AN EXTERNAL DEVICE BASED ON DEVICE IDENTIFICATION INFORMATION

CROSS-REFERENCE TO RELATED APPLICATIONS

The present application claims priority to and incorporates by reference the entire contents of Japanese Patent Application No. 2011-026556 filed in Japan on Feb. 9, 2011.

BACKGROUND OF THE INVENTION

1. Field of the Invention

The present invention relates to an information processing apparatus, method of controlling information processing apparatus, and computer program product.

2. Description of the Related Art

Conventionally, a universal serial bus (USB) connection, which connects a host machine with a plurality of peripherals (devices) by serial communication, has been widely used as a method of connecting electronic devices to each other. The USB is an interface standard that provides a hot plugging function, and can be removed or connected during operation of a device.

With the use of the USB, USB host interfaces have been increasingly mounted in image forming apparatuses having a single function such as a laser printer, or image forming apparatuses called multi function printers (MFPs) that implement a plurality of functions including such as scanner function, copying function, print function, and facsimile function in one housing. Various external devices are connected to these image forming apparatuses as external devices through the USB, including optional devices connected at all times to be used such as integrated circuit (IC) card readers and devices temporarily connected to be used such as flash memories.

Meanwhile, in recent years, demands for image forming apparatus having low power consumption have increased. Generally, in an image forming apparatus, low power mode for suppressing power consumption is implemented in such a manner that supply of power to various devices in the image forming apparatus are stopped during a standby state in which an image forming operation such as a print operation is not performed.

In the low power mode, it is desirable to suppress power consumption by stopping supply of power even to a USB host controller mounted in the image forming apparatus when an operation needs not be performed. Japanese Patent Application Laid-open No. 2000-010907 discloses a technique which determines whether or not a USB host controller is to stop depending on whether or not a USB device remains connected to the USB host controller. According to Japanese Patent Application Laid-open No. 2000-010907, power saving can be implemented because the USB host controller can be stopped when the USB device does not remain connected.

Meanwhile, there are various kinds of USB devices that can be connected to the USB host controller. For example, as the USB devices to connect to the USB host controller of the image forming apparatus, there are IC card readers for performing personal authentication, flash memories for storing image data or the like, and the like.

When many kinds of USB devices are connectable as described above, it is considered that whether or not an operation needs to be performed during the low power mode may depend on a kind of a connected USB device. For example, the IC card reader needs to be operating during the low power mode. However, the flash memory needs not be operating during the low power mode.

However, in the past, there was a problem in that it was difficult to determine, for each USB device, whether or not the operation thereof is necessary during the low power mode. For example, in Japanese Patent Application Laid-open No. 2000-010907, when even any one of the USB devices remains connected to the USB host controller, a function of the USB host controller is caused to be effective. However, according to this related art, a determination was not made about whether the function of the USB host controller is caused to be effective or ineffective for each USB device.

There is a need to more efficiently perform power saving of an apparatus in which a USB host controller is mounted.

SUMMARY OF THE INVENTION

It is an object of the present invention to at least partially solve the problems in the conventional technology.

According to an embodiment, there is provided an information processing apparatus that has a low power mode, in which supply of electric power to a component that needs not operate is restricted as an operation mode. The information processing apparatus includes: a communication control unit that controls communication with an external device; a table that in advance stores identification information identifying an external device in association with an operation need/no-need information representing an operation need/no-need of the external device in the low power mode; a power supply control unit that acquires identification information from an external device connected to the communication control unit at a time of transition to the low power mode, and performs control such that supply of electric power to the communication control unit is to be restricted when it is determined that the operation need/no-need information corresponding to the identification information represents the operation no-need based on the table, and such that supply of electric power to the communication control unit is continued when it is determined that the operation need/no-need information represents the operation need based on the table.

According to another embodiment, there is provided a method of controlling an information processing apparatus having a low power mode, in which supply of electric power to a component that needs not operate is restricted, as an operation mode, the information processing apparatus including a communication control unit that controls communication with an external device and a table that in advance stores identification information identifying an external device in association with an operation need/no-need information representing an operation need/no-need of the external device in the low power mode. The method includes: acquiring identification information from an external device connected to the communication control unit at the time of transition to the low power mode by a power control unit; and performing control such that supply of electric power to the communication control unit is restricted, by the power control unit, when it is determined that the operation need/no-need information corresponding to the identification information acquired at the acquiring of the identification information represents the operation no-need based on the table, and such that supply of electric power to the communication control unit is continued, by the power control unit, when it is determined that the operation need/no-need information represents the operation need.

According to still another embodiment, there is provided a computer program product including a non-transitory computer-usable medium having computer-readable program codes embedded in the medium for controlling an information processing apparatus having a low power mode, in which supply of electric power to a component that needs not operate is restricted, as an operation mode, the information processing apparatus including a communication control unit that controls communication with an external device and a table that in advance stores identification information identifying an external device in association with an operation need/no-need information representing an operation need/no-need of the external device in the low power mode. The program codes when executed causes a computer to execute: acquiring identification information from an external device connected to the communication control unit at the time of transition to the low power mode by a power control unit; and performing control such that supply of electric power to the communication control unit is restricted, by the power control unit, when it is determined that the operation need/no-need information corresponding to the identification information acquired at the acquiring of the identification information represents the operation no-need based on the table, and such that supply of electric power to the communication control unit is continued, by the power control unit, when it is determined that the operation need/no-need information represents the operation need.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a functional block diagram of an example for describing a function of the image forming apparatus according to the first embodiment;

FIG. 3 is a schematic diagram illustrating a device descriptor;

FIG. 4 is a schematic diagram illustrating a configuration descriptor;

FIG. 5 is a schematic diagram illustrating an interface descriptor;

FIG. 6 is a schematic diagram illustrating an end point descriptor;

FIG. 7 is a sequence diagram illustrating a sequence of an example of a descriptor acquiring process;

FIG. 8 is a schematic diagram illustrating a configuration of an example of a setting table according to the first embodiment;

FIG. 9 is a flowchart illustrating a process of an example of transitioning to a low power mode according to the first embodiment;

FIG. 15 is a flowchart illustrating a process of an example when being transitioned to a low power mode according to a second embodiment.

DETAILED DESCRIPTION OF THE PREFERRED EMBODIMENTS

First Embodiment

Hereinafter, exemplary embodiments of an image forming apparatus will be described in detail as an information processing apparatus according to a first embodiment with reference to the accompanying drawings. The information processing apparatus according to the embodiment stores information for setting an operation need/no-need of each USB device in a low power mode as a setting table in advance. Then, when transition to the low power mode is made, the information processing apparatus acquires identification information of a connected USB device, and refers to the setting table. At this time, when at least one of connected USB devices has been set to the operation need in the low power mode, electric power is continuously supplied to a USB host controller. However, when all of connected USB devices have been set to the operation no-need in the low power mode, power supply to the USB host controller is restricted. In the low power mode, electric power is continuously supplied to the USB host controller only when a USB device that needs to be operating in the low power mode is connected, and thus power saving can be efficiently implemented.

Figure 1:
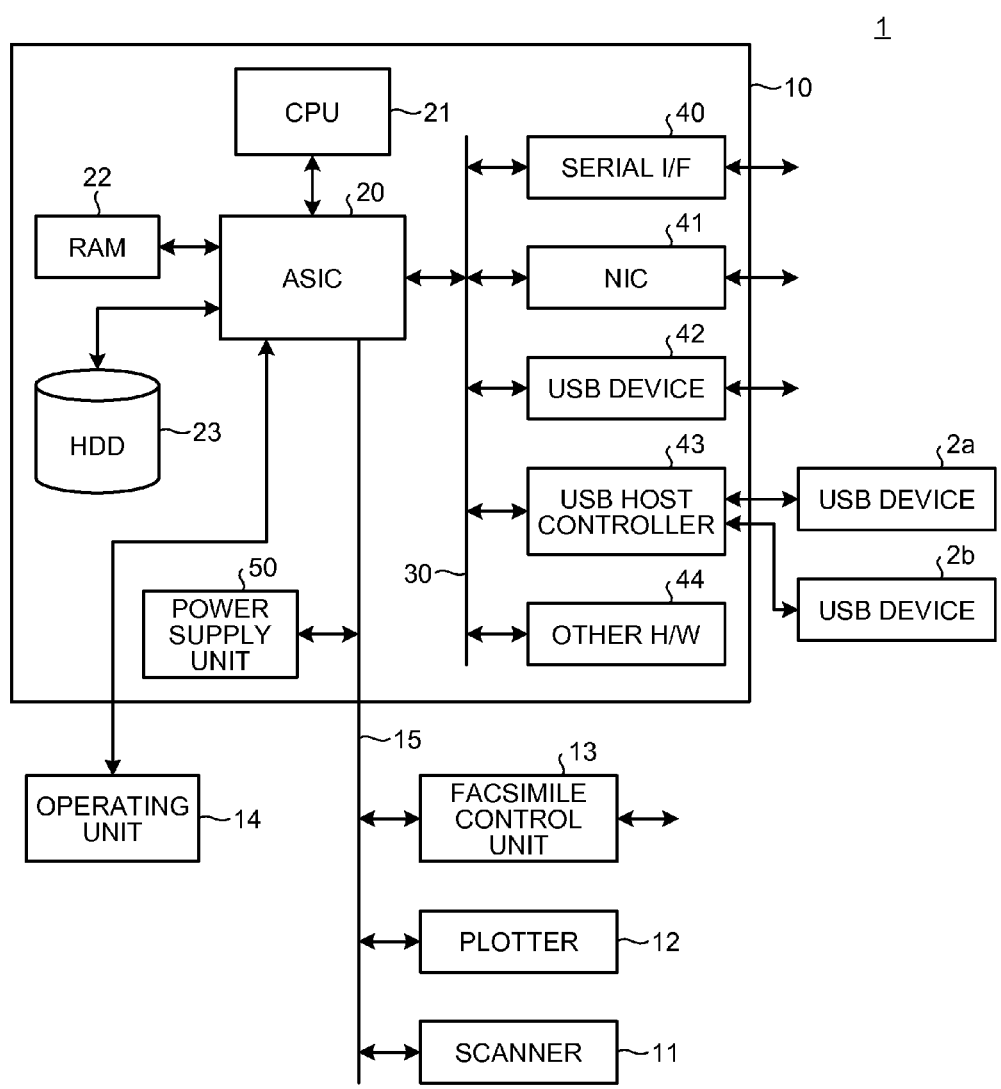
FIG. 1 is a block diagram illustrating a configuration of an example of an image forming apparatus serving as an information processing apparatus according to a first embodiment.

FIG. 1 illustrates a configuration of an example of an image forming apparatus 1 as an information processing apparatus according to the first embodiment. In a control unit 10, a central processing unit (CPU) 21, a random access memory (RAM) 22, a hard disk drive (HDD) 23, peripheral component interconnect (PCI) buses 15 and 30, and the like are connected to an application specific integrated circuit (ASIC) 20.

For example, a serial I/F 40, a network interface card (NIC) 41, a USB device 42, a USB host controller 43, and other hardware (H/W) 44 are connected to the PCI bus 30.

The ASIC 20 mediates communication between the CPU 21, the RAM 22, the HDD 23, and the PCI bus 30. The HDD 23 stores various kinds of data or a program for operating the CPU 21 in advance. The CPU 21 controls an overall operation of the image forming apparatus 1 according to the program stored in the HDD 23 using the RAM 22 as a work memory. At this time, interim data generated with the operation of the program may be temporarily stored in the HDD 23. In addition, the HDD 23 stores image data or the like supplied via the PCI bus 15, which will be described later. Further, a control signal generated from an operating unit 14 in response to a user's operation is supplied to the CPU 21 via the ASIC 20. Thus, the image forming apparatus 1 can be controlled in response to the user's operation.

For example, the serial I/F 40 is an interface for serial communication such as RS-232C. The NIC 41 controls communication via the Internet or a local area network (LAN). The USB device 42 is built in the image forming apparatus 1 and fixedly used. In the following, a USB device, which is internally connected and fixedly used in the image forming apparatus 1 is referred to as the USB device 42, and is distinguished from USB devices 2a and 2b which are externally connected to the image forming apparatus 1 through the USB host controller 43, which will be described later.

The USB host controller 43 manages a bus by a USB. The USB host controller 43 can be connected with a plurality of USB devices 2a and 2b. When the USB devices 2a and 2b are connected, the USB host controller 43 dynamically allocates bus addresses to the connected USB devices 2a and 2b, performs communication with the USB devices 2a and 2b, and acquires information called descriptors from the USB devices 2a and 2b.

An enhanced host controller interface (EHCI) or an open host controller interface (OHCI) may be used as hardware applicable as the USB host controller 43 of the first embodiment. However, hardware applicable as the USB host controller 43 of the first embodiment is not particularly limited thereto.

A scanner device 11, a plotter device 12, and a facsimile control unit 13 are connected to the PCI bus 15. The scanner device 11 scans a document image, outputs the scanned document image as image data, supplies the image data to the CPU 21 via the PCI bus 15 and the ASIC 20, and stores the image data in the HDD 23. The plotter device 12 is supplied with the image data read, for example, from the HDD 23 via the ASIC 20 and the PCI bus 15, and performs a printing process on a sheet based on the image data. The facsimile control unit 13 is connected, for example, to a public telephone line, and transmits the document image scanned by the scanner device 11 to a designated transmission destination.

A power supply unit 50 is further connected to the PCI bus 15. The power supply unit 50 supplies the respective components of the image forming apparatus 1 with electric power according to control of the CPU 21. At this time, when the operation mode of the image forming apparatus 1 is the low power mode in which the power saving operation is performed, the power supply unit 50 restricts supply of electric power to a component, which is set not to perform an operation in the low power mode, among the respective components of the image forming apparatus 1, according to an instruction from the CPU 21. For example, the image forming apparatus 1 transitions to the low power mode in response to a user's operation for instructing the operating unit 14 to transition to the low power mode, a previously designated time when a predetermined time operation is not made on the image forming apparatus 1, and the like.

FIG. 2 is a functional block diagram of an example for describing a function of the image forming apparatus 1 illustrated in FIG. 1. In FIG. 2, the same components as in FIG. 1 are denoted by the same reference numerals, and the redundant description will not be repeated. In the image forming apparatus 1, the scanner device 11, the plotter device 12, the facsimile control unit 13, and the H/W 44 are connected to an engine control board 130 which is of hardware mounted in the image forming apparatus 1, and performs communication with an operating system (OS) 100 via an engine I/F 102.

A platform is configured to include the OS 100 which is a general-purpose OS, a control service that analyzes a processing request from an application which will be described later and generates a hardware resource acquisition request, and a system resource manager (not illustrated) that performs management of one or more hardware resources and mediates the acquisition request from the control service.

In the example of FIG. 2, the control service includes a system control service 120 that provides control of an entire system, a facsimile control service 123 that provides control of the facsimile control unit 13, an engine control service 124 that provides control of the scanner device 11 and the plotter device 12, a memory control service 125 that provides control of a memory (the RAM 22 and the HDD 23), an operating unit control service 126 that provides control of the operating unit 14, and a network control service 127 that provides control of the NIC 41. The platform further includes an application programming interface (API) 101 that allows a processing request from each application to be received by a predefined function.

In the first embodiment, the control service further includes a USB device control service 121 and a USB device management service 122. The USB device control service 121 and the USB device management service 122 perform control and management of a USB device connected to the USB host controller 43. For example, the USB device management service 122 detects a USB device connected to the USB host controller 43.

Here, the OS 100 includes a USB driver 140 that performs relay between software and hardware of a USB device as part of a function. The control and management of the USB device by the USB device control service 121 and the USB device management service 122 are performed through the USB driver 140. For example, the OS 100 controls the USB host controller 43 through the USB driver 140 in response to instructions of the USB device control service 121 and the USB device management service 122 according to a request from an application, which will be described later. A PCI I/F 103 is an interface of the PCI buses 15 and 30 illustrated in FIG. 1.

In the example of FIG. 2, the application includes a copying application 110 functioning as an application for a copying process, a printer application 111 functioning as an application for a printing process, a scanner application 112 functioning as an application for a scanner process, a facsimile application 113 functioning as an application for facsimile transmission and reception, and a web application 114 that performs a data transfer process when Internet communication is performed through the NIC 41.

The processes of the applications and the processes of the control services implement a user service related to an image forming process such as the copying process, the printing process, the image scanning process, and the facsimile process while performing inter-process communication by function calling, return value transmission, and transmission and reception of a message.

For example, the power supply unit 50 supplies the respective components of the image forming apparatus 1 with electric power according to control of the OS 100 when the operation mode of the image forming apparatus 1 is of a normal mode. However, when the operation mode of the image forming apparatus 1 is of the low power mode, electric power is supplied only to a previously decided component of the image forming apparatus 1, and thus power consumption is suppressed.

The programs such as the control services, the applications, and the OS 100, which are illustrated in FIG. 2, are stored in the HDD 23 in advance and provided. However, the embodiment is not limited thereto, and part or all of the programs may be provided in a form stored in a storage medium such as a compact disk (CD), a digital versatile disk (DVD), a flexible disk (FD), and a removable non-volatile memory. In this case, a driver device that can read the storage medium is connected to the image forming apparatus 1. The program stored in the storage medium is read by the driver device, and then stored in the HDD 23 or the like. In addition, the program may be acquired from a network via the NIC 41.

USB Communication Procedure

Next, a description will be schematically made in connection with a procedure until communication when the USB devices 2a and 2b are connected the USB host controller 43. First, when the USB device 2a is connected to a USB device connection port of the USB host controller 43 and then the USB host controller 43 recognizes the USB device 2a, the USB host controller 43 allocates an address to the connected USB device 2a.

When the address is allocated to the connected USB device 2a, the USB host controller 43 starts acquiring a descriptor of the USB device 2a. In USB communication, the USB host controller 43 acquires a descriptor by control transfer from the target USB device 2a in a communication sequence between the USB host controller 43 and the USB device 2a. The descriptor includes information such as a character and an attribute of the target, and there are 4 kinds of descriptors: a device descriptor; a configuration descriptor; an interface descriptor; and an end point descriptor.

In the following, the four descriptors of the device descriptor, the configuration descriptor, the interface descriptor, and the end point descriptor are collectively referred to as a standard descriptor.

The 4 kinds of descriptors will be schematically described with reference to FIGS. 3 to 6. In FIGS. 3 to 6, an offset represents the number of bytes from the beginning. In FIGS. 3 to 6, each field has a data length indicated on the right of a field name, and a specified field in each descriptor can be accessed using an offset and a data length.

FIG. 3 illustrates the device descriptor. The device descriptor includes information for identifying a USB device that has transmitted the descriptor. In FIG. 3, the device descriptor includes a field bLength, a field bDescriptorType, a field bcdUSB, a field bDeviceClass, a field bDeviceSubclass, a field bDeviceProtocol, a field bMaxPacketSize0, a field idVendor, a field idProduct, a field bcdDevice, a field iManufacturer, a field iProduct, a field iSerialNumber, and a field bNumConfiguration.

Of these fields, the field bLength and the field bDescriptorType represent a byte length and the type of descriptor, respectively. The field bLength and the field bDescriptorType are provided in each descriptor.

In the device descriptor, the field bDeviceClass, the field bDeviceSubclass, and the field bDeviceProtocol represent a function of a USB device that has transmitted the descriptor. The field idVendor is a vendor ID identifying a vendor of a USB device that has transmitted the descriptor. Similarly, the field idProduct represents a product of a USB device that has transmitted the descriptor. A model of a USB device can be identified using the field idVendor and the field idProduct.

FIG. 4 illustrates the configuration descriptor. The configuration descriptor includes target USB configuration information and information representing the number of interface descriptors. In FIG. 4, the configuration descriptor includes a field bLength, a field bDescriptorType, a field wTotalLength, a field bNumInterface, a field bConfigurationValue, a field iConfuguration, a field bmAttributes, and a field bMaxPower.

In the configuration descriptor, a sixth bit of the field bmAttributes represents which of self power and bus power a USB device, which has transmitted the descriptor, supports. A fifth bit of the field bmAttributes represents whether or not a remote wake-up function is supported in the USB device.

FIG. 5 illustrates the interface descriptor. The interface descriptor includes information of an interface and the number of end point descriptors included in an interface. In FIG. 5, the interface descriptor includes a field bLength, a field bDescriptorType, a field bInterfaceNumber, a field bAlternateSetting, a field bNumEndpoint, a field bInterfaceClass, a field bInterfaceSubclass, a field bInterfaceProtocol, and a field iInterface.

FIG. 6 illustrates the end point descriptor. The end point descriptor includes information of the end point which is a communication port. In FIG. 6, the end point descriptor includes a field bLength, a field bDescriptorType, a field bEndpointAddress, a field bmAttributes, a field wMaxPacketSize, and a field bInterval. The interface descriptor and the end point descriptor illustrated in FIGS. 5 and 6 do not closely relate to the embodiment, and thus a description thereof is not provided.

FIG. 7 illustrates a sequence of an example of a descriptor acquiring process. In an example of FIG. 7, the USB host controller 43 acquires the device descriptor from the USB device 2a through a process "a" and acquires the configuration descriptor, the interface descriptor, and the end point descriptor from the USB device 2a through a process "b".

Specifically, the USB host controller 43 sets a parameter designating the device descriptor to a command GET_DESCRIPTOR which is a standard request, and issues the command GET_DESCRIPTOR to the USB device 2a (SEQ100). The USB device 2a transmits the device descriptor to the USB host controller 43 in response to the command (SEQ101).

Thereafter, in the same way, the USB host controller 43 sets a parameter designating the configuration descriptor to a command GET_DESCRIPTOR, and issues the command GET_DESCRIPTOR to the USB device 2a, and acquires the configuration descriptor (SEQ102 and SEQ103). Thereafter, in the same way, the USB host controller 43 repetitively performs the processes of SEQ102 and SEQ103, and acquires the interface descriptor and the end point descriptor from the USB device 2a.

Setting Table According to the First Embodiment

Next, a description will be made in connection with a setting table according to the first embodiment. As described above, in the embodiment, a setting table in which whether or not an operation needs to be performed in the low power mode (hereinafter, referred to as "operation need/no-need in the low power mode") is set to the USB device is stored in the image forming apparatus 1 in advance. In the first embodiment, information that represents models of the USB devices 2a and 2b is stored in the setting table in association with information for setting the operation need/no-need in the low power mode. The setting table is generated in advance and stored in a non-volatile storage medium, such as the HDD 23, included in the image forming apparatus 1.

FIG. 8 illustrates a configuration of an example of the setting table according to the first embodiment. In the first embodiment, information representing a model of a USB device connected to the USB host controller 43 is used as identification information of the USB device. In this example, the setting table is configured to include an entry in which the field idVendor representing a manufacturer (vendor) and the field idProduct representing a product, which are included in the device descriptor, are associated with the operation need/no-need information representing the operation need/no-need. That is, in this example, information that represents a vendor and information representing a product are used as identification information identifying a model of a USB device.

In this example, an operation need/no-need flag having a value of either "1" or "0" is used as the operation need/no-need information. For example, the operation need/no-need flag having a value of "1" represents "operation need" represents that a USB device identified by the field idVendor and the field idProduct needs to be operating even in the low power mode. The operation need/no-need flag having a value of "0" represents "no-need" represents that a USB device identified by the field idVendor and the field idProduct needs not to be operating in the low power mode.

In the example of FIG. 8, in a USB device (an IC card reader) represented by the field idVendor having a value of "0x05CA" and the field idProduct having a value of "0x2218" and a USB device represented by the field idVendor having a value of "0x05CA" and the field idProduct having a value of "0x0105", a value of the operation need/no-need flag is set to "1" and represents that an operation needs to be performed in the low power mode. In a USB device (a USB hub) represented by the field idVendor having a value of "0xFFFF" and the field idProduct having a value of "0x0001", a value of the operation need/no-need flag is set to "0" and represents that an operation needs not be performed in the low power mode. Further, "0x" in the value of each field represents that a subsequent character string is a number of a hexadecimal notation.

Process According to First Embodiment

FIG. 9 is a flowchart illustrating a process of an example of transitioning to the low power mode according to the first embodiment. Each process in the flowchart is executed by control of the CPU 21 according to the program. More specifically, each process in the flowchart of FIG. 9 is executed by the USB device management service 122 in the control service. The process according to the flowchart of FIG. 9 starts when the operation mode of the image forming apparatus 1 transitions to the low power mode by a user's operation on the operating unit 14 or a timer process.

First, in step S100, the CPU 21 requests the USB host controller 43 to acquire the standard descriptor from the USB devices 2a and 2b connected to the USB host controller 43. The USB host controller 43 acquires the standard descriptor of one (for example, the USB device 2a) of the USB devices 2a and 2b connected to the USB host controller 43 in response to the request through the procedure described with reference to FIG. 7. The acquired standard descriptor is transferred to the CPU 21.

Next, in step S101, the CPU 21 extracts the field idVendor and the field idProduct used as the identification information from the device descriptor of the standard descriptor, which has been acquired in step S100, transferred from the USB host controller 43. Then, in step S102, by comparing the extracted field idVendor and the field idProduct with the setting table previously stored in the HDD 23, it is determined whether or not the setting table has an entry matching with the extracted field idVendor and the field idProduct. When it is determined in step S102 that the setting table has no entry matching with the extracted field idVendor and the field idProduct, the CPU 21 causes the process to proceed to step S105 which will be described later.

However, when it is determined in step S102 that the setting table has an entry matching with the extracted field idVendor and the field idProduct, the CPU 21 causes the process to proceed to step S103. In step S103, the CPU 21 checks a value of the operation need/no-need flag in the corresponding entry. Then, in step S104, determined is which of the operation need and the operation no-need the value of the operation need/no-need flag represents. When it is determined that the value of the operation need/no-need flag is "1", that is, represents that the target USB device (for example, the USB device 2a) needs to be operating even in the low power mode (operation need), the process proceeds to step S107 which will be described later.

However, when it is determined in step S104 that the value of the operation need/no-need flag is "0", that is, represents that the target USB device needs not be operating in the low power mode (no need), the CPU 21 causes the process to proceed to step S105.

In step S105, the CPU 21 determines whether the process has been completed on all of the USB devices 2a and 2b connected to the USB host controller 43. When it is determined that the process has not been completed yet, the process returns to step S100, and the same process is performed on the next USB device (for example, the USB device 2b) connected to the USB host controller 43. However, when it is determined that the process has been completed on all of the USB devices 2a and 2b, the process proceeds to step S106.

At a point in time of step S106, it is determined that all of the USB devices 2a and 2b connected to the USB host controller 43 need not be operating in the low power mode. Thus, in step S106, the CPU 21 performs control such that power supply to the USB host controller 43 is restricted. For example, the CPU 21 controls the power supply unit 50 such that power supply to the USB host controller 43 is stopped. Then, the process proceeds to step S107.

In step S107, the CPU 21 shifts the process onto other operations in the low power mode, that is, shifts the process onto an operation other than power supply control on the USB host controller 43. For example, other operations in the low power mode may be an operation of stopping power supply to a display device provided in the operating unit 14 or a process of stopping the HDD 23.

Here, when it is determined in step S104 that the target USB device whose value of the operation need/no-need flag is "1" needs to be operating even in the low power mode, the process proceeds to step S107. This means that when even one of USB devices connected to the USB host controller 43 needs to be operating even in the low power mode, power supply to the USB host controller 43 is not restricted, and power supply is performed as usual.

A description will be made in connection with power supply control on each hardware in the image forming apparatus 1 when transition to the low power mode is made according to the setting table of FIG. 8 and the flowchart of FIG. 9, with reference to FIGS. 10 and 11.

Figure 10:
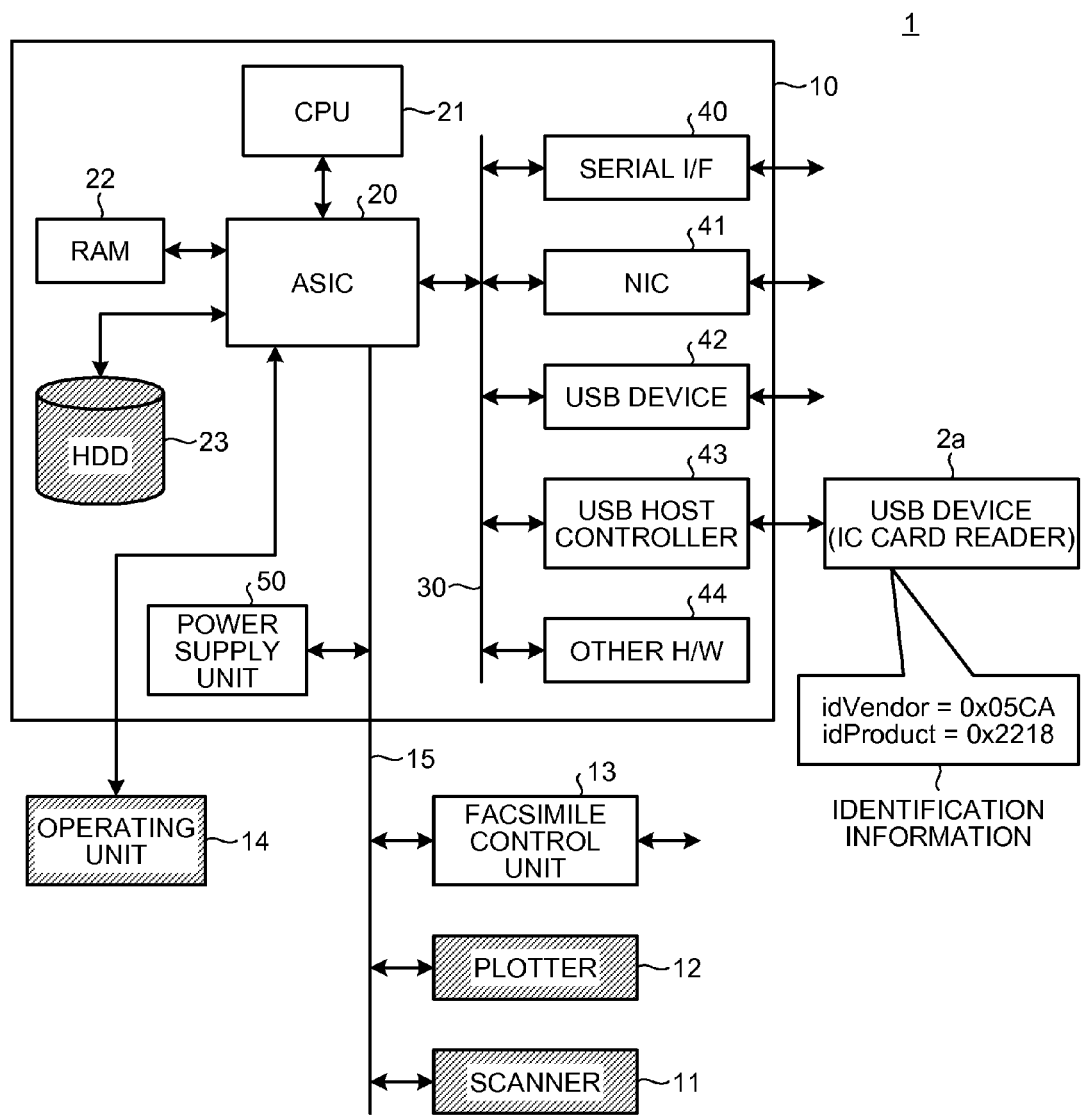
FIG. 10 is a block diagram for describing power supply control when transitioned to a low power mode according to the first embodiment.

FIG. 10 illustrates an example in which the USB device 2a (referred to as "IC card reader") that needs to be operating even in the low power mode is connected to the USB host controller 43. In this example, as the identification information for the USB device 2a, a value "0x05CA" and a value "0x2218" are stored in the field idVendor and the field idProduct of the standard descriptor, respectively.

In this case, in step S100 in the flowchart of FIG. 9, the standard descriptor including identification information 200 is acquired from the USB device 2a. In the setting table illustrated in FIG. 8, an entry matching with the acquired identification information 200 is present (steps S101 and S102). Thus, the CPU 21 checks the value of the operation need/no-need flag in the corresponding entry (step S103). In the example of FIG. 8, the value of the operation need/no-need flag is set to "1", and so it is determined that the USB device 2a needs to be operating even in the low power mode (operation need) (step S104).

The CPU 21 controls supply of electric power to the respective components of the image forming apparatus 1 according to the determination result of step S104. In this example in which the USB device 2a needs to be operating even in the low power mode, when transition to the low power mode is made, restricted is supply of electric power, for example, to the scanner device 11, the plotter device 12, the operating unit 14, and the HDD 23 (which are indicated by hatching in FIG. 10). However, supply of electric power to the USB host controller 43 is not restricted but continuously performed. As an example, the CPU 21 controls the power supply unit 50 such that supply of electric power to the scanner device 11, the plotter device 12, the operating unit 14, and the HDD 23 is stopped.

By controlling power supply in the above described way, it is possible to operate the USB host controller 43 and the USB device 2a connected to the USB host controller 43 in the low power mode, and thus power saving can be implemented. In the example in which the USB device 2a is the IC card reader, the USB device 2a which is the IC card reader can read the IC card for performing user authentication and the like even in the low power mode.

Figure 11:
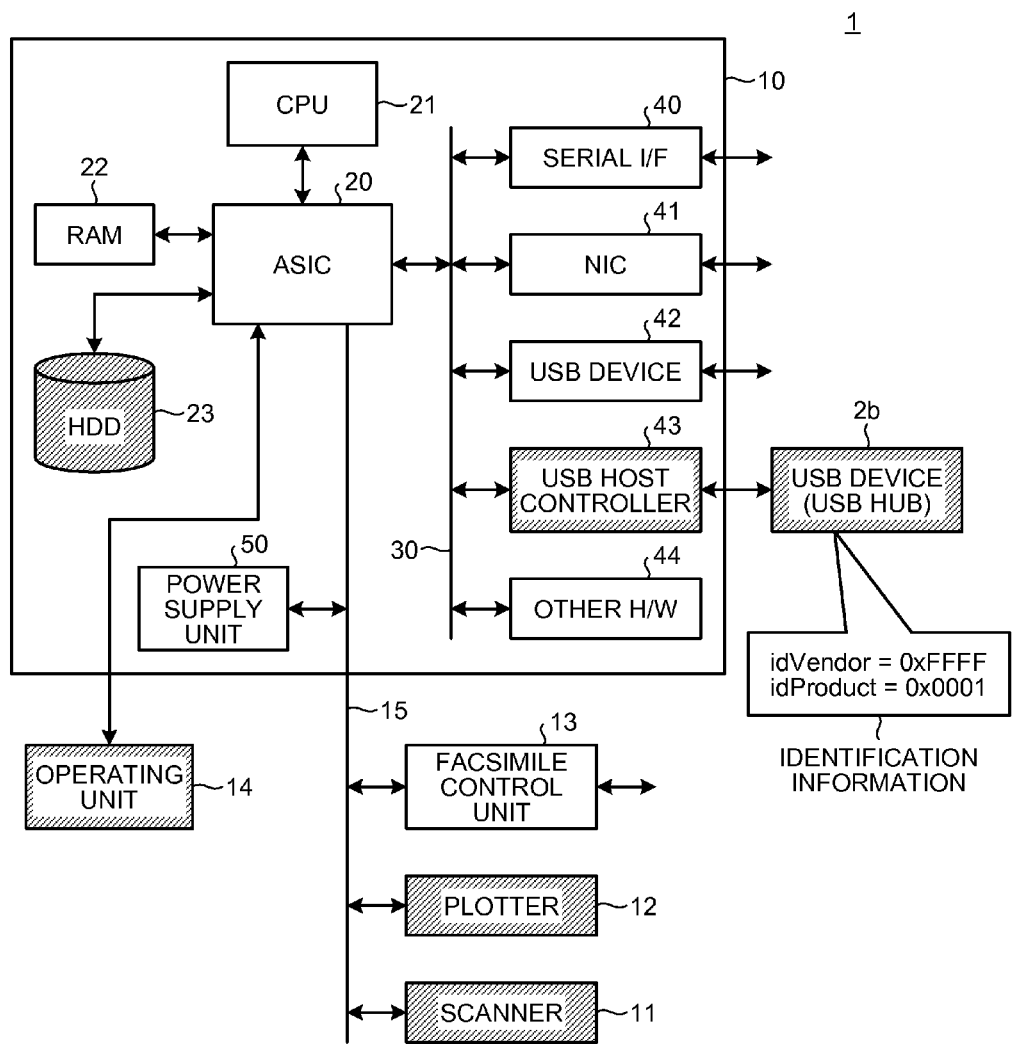
FIG. 11 is a block diagram for describing power supply control when transitioned to a low power mode according to the first embodiment.

FIG. 11 illustrates an example in which the USB device 2b (referred to as "USB hub") that needs not be operating in the low power mode is connected to the USB host controller 43. In this example, as the identification information for the USB device 2b, a value "0xFFFF" and a value "0x0001" are stored in the field idVendor and the field idProduct of the device descriptor in the standard descriptor, respectively.

In this example, in the setting table illustrated in FIG. 8, present is an entry matching with identification information 200' included in the standard descriptor acquired from the USB device 2b in step S100 of the flowchart of FIG. 9 (steps S101 and S102). Thus, the CPU 21 checks the value of the operation need/no-need flag in the corresponding entry (step S103). In the example of FIG. 8, the value of the operation need/no-need flag is set to "0", and so it is determined that the USB device 2b needs not be operating in the low power mode (operation no-need) (step S104).

The CPU 21 controls supply of electric power to the respective components of the image forming apparatus 1 according to the determination result of step S104. In this example in which the USB device 2b needs not be operating in the low power mode, when transition to the low power mode is made, restricted is supply of electric power, for example, to the scanner device 11, the plotter device 12, the operating unit 14, the HDD 23, and the USB host controller 43 (which are indicated by hatching in FIG. 11). As an example, the CPU 21 controls the power supply unit 50 such that supply of electric power to the scanner device 11, the plotter device 12, the operating unit 14, the HDD 23, and the USB host controller 43 is stopped.

In this case, by stopping supply of electric power to the USB host controller 43, supply of electric power to the USB device 2b connected to the USB host controller 43 is also stopped (when electric power of the USB device 2b is bus power). As a result, effective power saving can be implemented.

Process of Recognizing Newly Connected USB Device During Transition Process into Low Power Mode Since a USB device supports a hot plugging function, a USB device may be newly connected to the USB host controller 43 during a process of transitioning to the low power mode. In the first embodiment, when transition to the low power mode is set, a process of recognizing a newly connected USB device by the USB host controller 43 is put on hold. Then, depending on a result of a determination as to whether or not a USB device already connected to the USB host controller 43 needs to be operating even in the low power mode, it is determined whether or not the process of recognizing the newly connected USB device which is put on hold is to resume.

Figure 12:
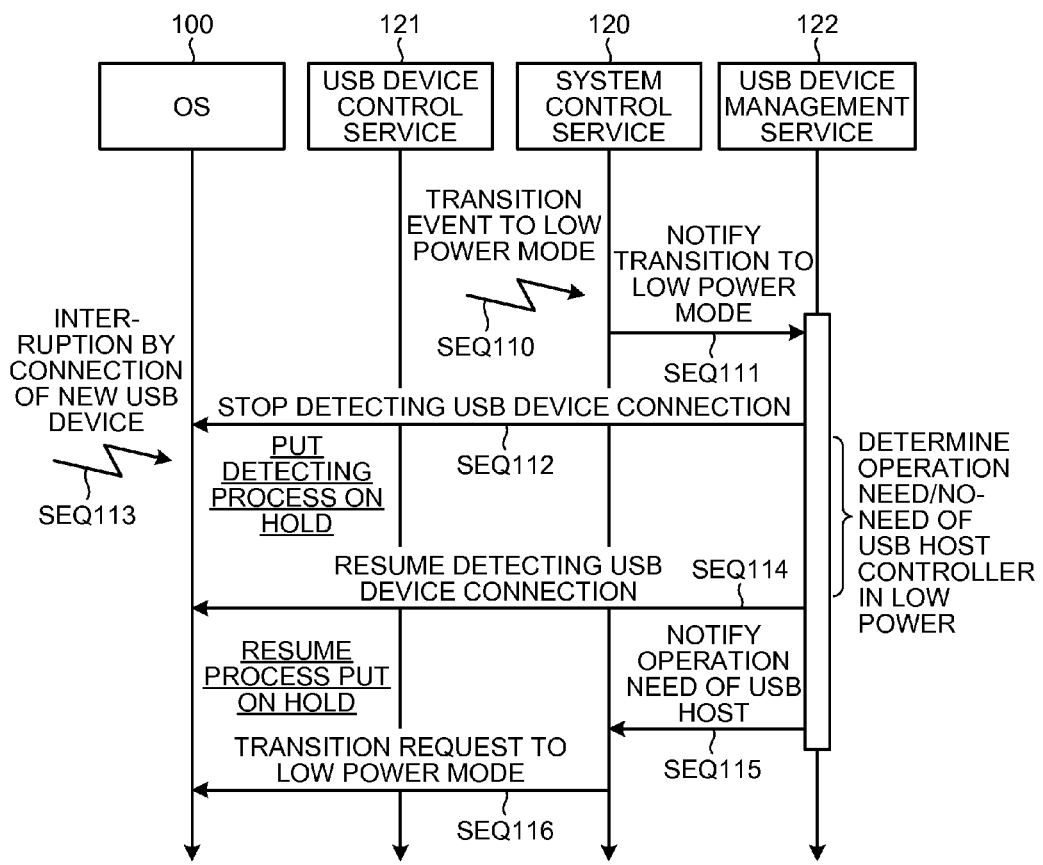
FIG. 12 is a sequence diagram illustrating an example of a first sequence of putting a recognition process of a newly connected USB device on hold during a process of transitioning to a low power mode.

FIG. 12 illustrates an example of a first sequence of putting a process of recognizing a newly connected USB device on hold during a process of transitioning to the low power mode. When a transition event to the low power mode is generated by a user's operation on the operating unit 14 or a timer process (SEQ110), the system control service 120 notifies the USB device management service 122 of transition to the low power mode (SEQ111). The USB device management service 122 which has received the notice starts the process according to the flowchart of FIG. 9, and requests the OS 100 to stop a process for detecting a connection of a USB device (SEQ112).

For example, the OS 100 commands the USB host controller 43 to hold the process for detecting a USB device to be newly connected in response to the request made in SEQ112. In response to the command, even though an interruption is generated due to a new connection of a USB device after SEQ112 (SEQ113), the USB host controller 43 does not perform the recognition process on the USB device, for example, a process of allocating an address to the USB device and acquiring the standard descriptor.

The USB device management service 122 causes the process to proceed to step S107 when the process proceeds to step S104 of the flowchart of FIG. 9 and it is determined that a USB device of a processing target needs to be operating even in the low power mode. At the same time, the USB device management service 122 requests the OS 100 to resume the process for detecting a connection of a USB device (SEQ114). In response to the request, the OS 100 resumes the process for detecting a connection of the newly connected USB device, which was put on hold in SEQ113.

In addition, the USB device management service 122 notifies the system control service 120 of the intent that the USB host controller 43 needs to be operating in the low power mode (SEQ115). In response to the notice, the system control service 120 requests the OS 100 to transition to the low power mode (SEQ116). In response to the request, the OS 100 restricts supply of electric power to previously decided components excluding the USB host controller 43. For example, the OS 100 controls the power supply unit 50 such that supply of electric power to the scanner device 11, the plotter device 12, the operating unit 14, and the HDD 23 in the image forming apparatus 1 is stopped as described above with reference to FIG. 10.

Figures 13, 14:
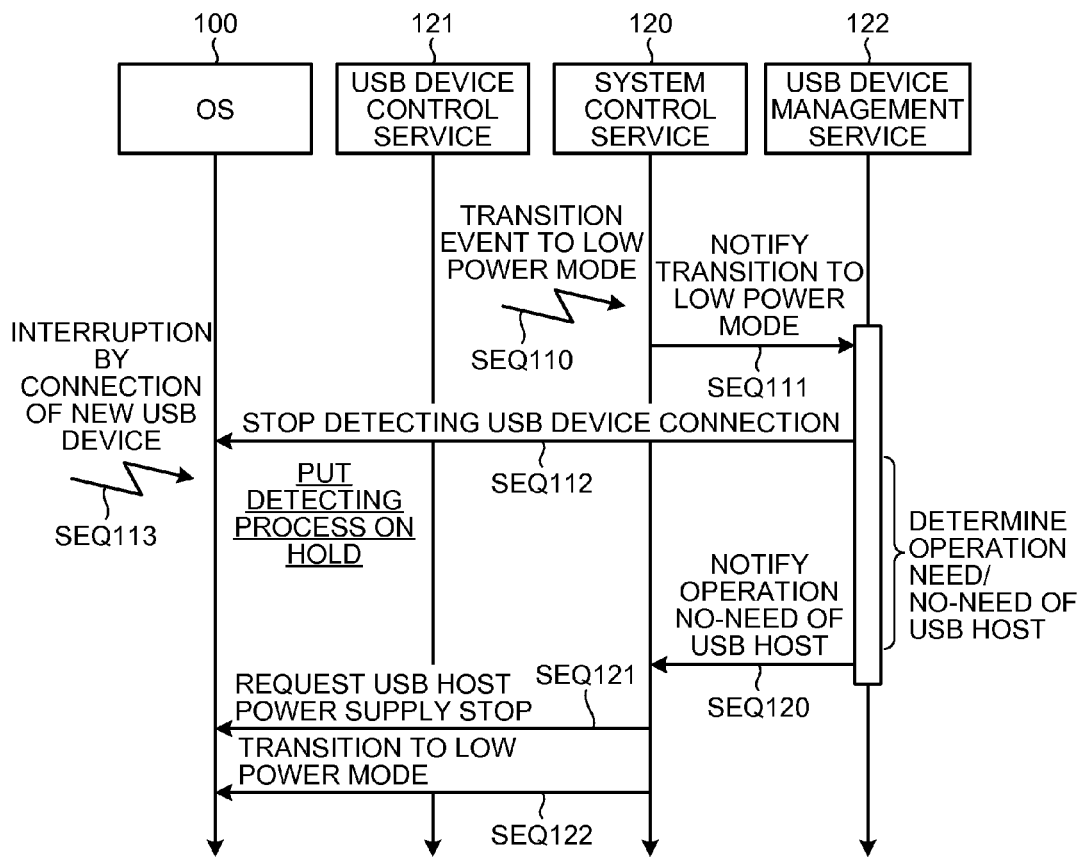
FIG. 13 is a sequence diagram illustrating an example of a second sequence of putting a recognition process of a newly connected USB device on hold during a process of transitioning to a low power mode.
FIG. 14 is a schematic diagram illustrating a configuration of an example of a setting table according to a modification of the first embodiment.

FIG. 13 illustrates an example for a second sequence of putting a process of recognizing a newly connected USB device on hold during a process of transitioning to the low power mode. In FIG. 13, the same parts as in FIG. 12 are denoted by the same reference numerals, and a detailed description thereof will not be repeated. When a transition event to the low power mode is generated (SEQ110), the system control service 120 notifies the USB device management service 122 of transition to the low power mode (SEQ111). In response to the notice, the USB device management service 122 starts the process according to the flowchart of FIG. 9, and requests the OS 100 to stop a process for detecting a connection of a USB device (SEQ112). In response to the request, the OS 100 commands the USB host controller 43 to put the process for detecting a newly connected USB device on hold.

The USB device management service 122 causes the process to proceed to step S105 when the process proceeds to step S104 of the flowchart of FIG. 9 and it is determined that a USB device of a processing target needs not be operating in the low power mode. At the present point in time, when the process of steps S100 to S104 has not been finished on all of USB devices whose connection to the USB host controller 43 has been recognized, the process returns to step S100, and the process is performed on a next USB device.

Meanwhile, when it is determined that none of USB devices recognized by the USB host controller 43 needs to be operating in the low power mode, the USB device management service 122 notifies the system control service 120 of the fact (SEQ120). Unlike the example of FIG. 12, performed is not a resume request for requesting the OS 100 to resume the process for detecting a connection of a USB device.

In response to the notice from the USB device management service 122, the system control service 120 requests the USB host controller 43 to stop power supply (SEQ121). In response to the request, for example, the OS 100 controls the power supply unit 50 such that power supply to the USB host controller 43 is stopped. In addition, the system control service 120 requests the OS 100 to transition to the low power mode (SEQ122). That is, in this case, the process of detecting a connection of a USB is put on hold, and transition to the low power mode is made. In response to the request, the OS 100 restricts supply of electric power to previously decided parts including the USB host controller 43. For example, the OS 100 controls the power supply unit 50 such that supply of electric power to the scanner device 11, the plotter device 12, the operating unit 14, the HDD 23, and the like in the image forming apparatus 1 is stopped as described above with reference to FIG. 11.

As described above, in the first embodiment, by controlling power supply when transition to the low power mode is made depending on whether or not a connected USB device needs to operate in the low power mode, it is possible to effectively implement power saving while causing a function required by a USB device to be effective.

Modification of the First Embodiment

Next, a description will be made in connection with a modification of the first embodiment. In the first embodiment, information representing a model of a USB device connected to the USB host controller 43 is used as identification information for identifying the corresponding USB device. On the other hand, in the modification of the first embodiment, information representing a kind of a USB device is used as identification information for identifying the corresponding USB device.

FIG. 14 illustrates a configuration of an example of a setting table according to the modification of the first embodiment. In this example, the setting table is configured to include an entry in which a field bDeviceClass, a field bDeviceSubclass, and a field bDeviceProtocol, which represents a kind of USB device and are included in the device descriptor, are associated with the operation need/no-need information (the operation need/no-need flag).

Further, when the field bDeviceClass, the field bDeviceSubclass, and the field bDeviceProtocol are used as the identification information, a so-called wild card "*" meaning that an arbitrary value is allowed may be used as an entry value.

In the example of FIG. 14, in an entry of a first row, the field bDeviceClass, the field bDeviceSubclass, and the field bDeviceProtocol have a value of "0x0B", a value of "*", and a value of "*", respectively, and are associated with the operation need/no-need flag having a value of "1". The field bDeviceSubclass and the field bDeviceProtocol have arbitrary values. For example, the entry of the first row represents a smart card. Similarly, in an entry of a second row, the field bDeviceClass, the field bDeviceSubclass, and the field bDeviceProtocol have a value of "0x03", a value of "*", and a value of "0x01", respectively, and are associated with the operation need/no-need flag having a value of "1". The field bDeviceSubclass has an arbitrary value. For example, the entry of the second row represents a USB keyboard. Further, in an entry of a third row, the field bDeviceClass, the field bDeviceSubclass, and the field bDeviceProtocol have a value of "0x09", a value of "0x00", and a value of "*", respectively, and are associated with the operation need/no-need flag having a value of "0". The field bDeviceProtocol has an arbitrary value. For example, the entry of the third row represents a USB hub.

Using the setting table in which the entries are provided as described above, power supply can be controlled, when transition to the low power mode is made, depending on whether or not a connected USB device needs to operate in the low power mode through the same process as in the first embodiment. Thus, it is possible to effectively implement power saving while causing a function required by a USB device to be effective.

In addition, since the setting table is configured using information representing a kind of a USB device, the process in the low power mode can be applied depending on a function of a USB device or the like regardless of the manufacturer or model of the USB device.

Furthermore, as a combination of the first embodiment and the present modification, the setting table may be configured using both information representing a model of a USB device and information representing a kind of a USB device. In this case, the field idVendor, the field idProduct, the field bDeviceClass, the field bDeviceSubclass, and the field bDeviceProtocol are acquired as the identification information of the USB device, and values of all of the fields are compared with values of the setting table.

Second Embodiment

Next, a second embodiment will be described. The second embodiment will be described in connection with an example in which a USB device supports a remote wake-up function. Here, the remote wake-up function according to the USB standard will be schematically described.

In the USB, a bus has two states of an operation state and a suspension state. The operation state refers to a state in which a bus is active. In the operation state, a start of frame (SOF) representing the start of a frame is transmitted to a USB device at predetermined intervals. Further, in the operation state, electric power is supplied from a USB host controller to a USB device through a USB cable. The suspension state refers to a state in which a bus is idle. For example, in the suspension state, the USB host controller stops transmitting the SOF to the USB device, and restricts supply of electric power to the USB device. As a result, power consumption in the USB host controller is reduced.

The remote wake-up function refers to a function that allows a USB device in the suspension state to release the suspension state by itself. For example, when a predetermined time elapses from a point in time at which transition to the suspension state has been made, a USB device transmits a remote wake-up signal to a USB host controller by a predetermined trigger such as a timer process. When the remote wake-up signal is received, the USB host controller causes a bus to transition from the idle state to the active state.

In the second embodiment, when it is recognized that a connected USB device needs to be operating in the low power mode, the USB host controller 43 checks whether or not the USB device has the remote wake-up function. When it is determined that the USB device has the remote wake-up function, a USB device connection port connected to the USB device is caused to enter the suspension state, and the process on a next USB device is performed.

In the second embodiment, the image forming apparatus 1 described with reference to FIGS. 1 and 2 in the first embodiment can be applied as an information processing apparatus as it is. Further, the setting table described with reference to FIG. 8 or 14 in the first embodiment or the modification of the first embodiment can be applied "as is" as the setting table for determining the operation need/no-need of the USB devices 2a and 2b in the low power mode.

FIG. 15 is a flowchart illustrating a process of an example when transition to the low power mode is made according to the second embodiment. Each process in the flowchart is executed by control of the CPU 21 according to the program. More specifically, each process in the flowchart of FIG. 15 is executed by the USB device management service 122 in the control service. The process according to the flowchart of FIG. 15 starts when the operation mode of the image forming apparatus 1 transitions to the low power mode by a user's operation on the operating unit 14 or a timer process.

First, in step S200, the CPU 21 initializes a value of a flag FLAG to "0". Next, in step S201, the CPU 21 requests the USB host controller 43 to acquire the standard descriptor from the USB devices 2a and 2b connected to the USB host controller 43. In response to the request, the USB host controller 43 acquires the standard descriptor of, for example, the USB device 2a connected to the USB host controller 43, and transfers the acquired standard descriptor to the CPU 21.

Next, in step S202, the CPU 21 extracts a field, which has been previously set to the setting table as identification information, from the standard descriptor transferred from the USB host controller 43 through the process of step S201. Then, in step S203, by comparing the extracted field with the setting table previously stored in the HDD 23, it is determined whether or not the setting table has an entry matching with a value of the extracted field. When it is determined in step S203 that the setting table has no entry matching with the value of the extracted field, the CPU 21 causes the process to transition to step S209 which will be described later.

However, when it is determined in step S203 that the setting table has an entry matching with the value of the extracted field, the CPU 21 causes the process to transition to step S204, and checks a value of the operation need/no-need flag in the corresponding entry. Then, in step S205, determined is which of the operation need and the operation no-need the value of the operation need/no-need flag represents. When it is determined that the value of the operation need/no-need flag is "1" and represents that the target USB device (for example, the USB device 2a) needs to be operating even in the low power mode (need), the process proceeds to step S206.

However, when it is determined that the value of the operation need/no-need flag is "0", that is, represents that the target USB device needs not be operating in the low power mode (no need), the CPU 21 causes the process to transition to step S209 which will be described later.

In step S206, the CPU 21 sets the value of the flag FLAG to "1", and the process proceeds to step S207. In step S207, the CPU 21 determines whether or not the target USB device (for example, the USB device 2a) has the remote wake-up function. For example, the CPU 21 extracts a value of a fifth bit of the field bmAttributes representing the presence and absence of the remote wake-up function from the configuration descriptor in the standard descriptor acquired in step S201, and determines whether or not the value represents "the remote wake-up function is supported". When it is determined that the remote wake-up function is not supported, the process proceeds to step S209 which will be described later.

However, when it is determined in step S207 that the value of the fifth bit of the field bmAttributes represents that the remote wake-up function is supported, the process proceeds to step S208. In step S208, the CPU 21 commands the USB host controller 43 to cause a USB device connection port to which the target USB device is connected to enter the suspension state. In response to the command, the USB host controller 43 causes the USB device connection port to enter the suspension state. The CPU 21 causes the process to proceed to step S209.

In step S209, the CPU 21 determines whether or not the process has been completed on all of the USB devices 2a and 2b connected to the USB host controller 43. When it is determined that the process has not been completed yet, the process returns to step S201, and the same process is performed on the next USB device (for example, the USB device 2b) connected to the USB host controller 43. However, when it is determined that the process has been completed on all of the USB devices 2a and 2b, the process proceeds to step S210.

In step S210, the CPU 21 determines whether or not the value of the flag FLAG is "0". When it is determined that the value of the flag FLAG is "0" the process proceeds to step S211. In this case, it can be determined that any of the USB devices 2a and 2b connected to the USB host controller 43 needs not be operating in the low power mode. For this reason, for example, the CPU 21 controls the power supply unit 50 such that supply of electric power to the USB host controller 43 is restricted.

Then, the CPU 21 causes the process to proceed to step S212, and shifts the process onto other processing in the low power mode, that is, shifts the process onto an operation other than power supply control on the USB host controller 43.

However, when it is determined in step S210 that the value of the flag FLAG is "1", the CPU 21 causes the process to proceed to step S212. That is, in this case, it can be determined that at least one of the USB devices 2a and 2b connected to the USB host controller 43 needs to be operating in the low power mode. For this reason, electrical power is continuously supplied to the USB host controller 43.

As described above, according to the second embodiment, when a connection of a USB device that needs to be operating in the low power mode is detected, the detection of the USB device is stored using the flag FLAG, and it is determined whether or not the USB device has the remote wake-up function. For this reason, when transition to the low power mode is made, the connection port of the USB device that needs to be operating in the low power mode and has the remote wake-up function can be caused to enter the suspension state, and thus more effective power saving can be implemented.

According to the embodiment, there is an effect capable of more efficiently performing power saving of an apparatus in which a USB host controller is mounted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus including a low power mode, in which supply of electric power to a component that needs not operate is restricted, as an operation mode, comprising:
a processor; and
a memory that stores a plurality of units,
wherein the plurality of units include:

a communication controller configured to control communication with an external device;
a table including identification information identifying an external device in association with an operation need/no-need information representing an operation need/no-need of the external device in the low power mode; and
a power supply controller configured to acquire identification information from at least one external device connected to the communication controller at a time of transition to the low power mode, and perform control
such that supply of electric power to the communication controller is restricted when it is determined that the operation need/no-need information corresponding to the identification information represents the operation no-need based on the table, and
such that supply of electric power to the communication controller is continued when it is determined that the operation need/no-need information represents the operation need based on the table.

2. The information processing apparatus according to claim 1,
wherein the power supply controller, at the time of transition to the low power mode, is configured to cause the external device to transition into a suspension state when the operation need/no-need information corresponding to the identification information acquired from the external device connected to the communication controller represents the operation need and the external device supports a remote wake-up.

3. The information processing apparatus according to claim 1,
wherein the power supply controller, at the time of transition to the low power mode, is configured to
stop detecting a newly connectable external device that is to be newly connected to the communication controller,
acquire identification information from the at least one external device connected to the communication controller, and
resume the detecting when the operation need/no-need information corresponding to the identification information is set to an operation need.

4. The information processing apparatus according to claim 1,
wherein the power supply controller is configured to perform control, at the time of transition to the low power mode, such that supply of electrical power to the communication controller is restricted when identification information corresponding to identification information acquired from an external device connected to the communication controller is not stored in the table.

5. The information processing apparatus according to claim 1, wherein
the power supply controller is configured to perform control such that supply of electrical power to the communication controller is continued when the operation need/no-need information corresponding to identification information of the at least one external devices connected to the communication controller represents an operation need.

6. The information processing apparatus according to claim 1, wherein
the identification information is information identifying a model of the at least one external device.

7. The information processing apparatus according to claim 1, wherein
the identification information is information identifying a function of the at least one external device.

8. A method of controlling an information processing apparatus having a low power mode, in which supply of electric power to a component that needs not operate is restricted, as an operation mode,
the information processing apparatus including a communication controller that controls communication with an external device and a table that in advance stores identification information identifying an external device in association with an operation need/no-need information representing an operation need/no-need of the external device in the low power mode,
the method comprising:
acquiring identification information from an external device connected to the communication controller at the time of transition to the low power mode by a power control unit; and
performing control
such that supply of electric power to the communication controller is restricted, by a power supply controller, when it is determined that the operation need/no-need information corresponding to the identification information acquired at the acquiring of the identification information represents the operation no-need based on the table, and
such that supply of electric power to the communication controller is continued, by the power supply controller, when it is determined that the operation need/no-need information represents the operation need.

9. A computer program product comprising a non-transitory computer-usable medium having computer-readable program codes embedded in the medium for controlling an information processing apparatus having a low power mode, in which supply of electric power to a component that needs not operate is restricted, as an operation mode,
the information processing apparatus including a communication controller that controls communication with an external device and a table that in advance stores identification information identifying an external device in association with an operation need/no-need information representing an operation need/no-need of the external device in the low power mode, the program codes when executed causing a computer to execute:
acquiring identification information from an external device connected to the communication controller at the time of transition to the low power mode by a power control unit; and
performing control
such that supply of electric power to the communication controller is restricted, by a power supply controller, when it is determined that the operation need/no-need information corresponding to the identification information acquired at the acquiring of the identification information represents the operation no-need based on the table, and
such that supply of electric power to the communication controller is continued, by the power supply controller, when it is determined that the operation need/no-need information represents the operation need.

10. An information processing apparatus including a low power mode, in which supply of electric power to a component that needs not operate is restricted, as an operation mode, comprising:
a computer program product that includes a non-transitory computer-usable medium having computer-readable program codes embedded in the medium for controlling the information processing apparatus;

a communication controller that controls communication with an external device and a table that in advance stores identification information identifying an external device in association with an operation need/no-need information representing an operation need/no-need of the external device in the low power mode, wherein the program codes when executed cause a processor of the information processing apparatus to execute:

acquiring identification information from an external device connected to the communication controller at the time of transition to the low power mode by a power control unit; and performing control
   such that supply of electric power to the communication controller is restricted, by power supply controller, when it is determined that the operation need/no-need information corresponding to the identification information acquired at the acquiring of the identification information represents the operation no-need based on the table, and
   such that supply of electric power to the communication controller is continued, by power supply controller, when it is determined that the operation need/no-need information represents the operation need.

* * * * *